United States Patent [19]
Eldridge, Jr.

[11] Patent Number: 4,886,104
[45] Date of Patent: Dec. 12, 1989

[54] WINDOW SHADE APPARATUS

[76] Inventor: John D. Eldridge, Jr., 971 Bayside Cove West, Newport Beach, Calif. 92660

[21] Appl. No.: 232,542

[22] Filed: Aug. 11, 1988

Related U.S. Application Data

[63] Continuation of Ser. No. 14,866, Feb. 17, 1987, which is a continuation-in-part of Ser. No. 881,842, Jul. 3, 1986, abandoned.

[51] Int. Cl.$^4$ ................................................ B60J 3/00
[52] U.S. Cl. ................................. 160/370.2; 160/84.1; 296/97.7; 296/97.4
[58] Field of Search .................... 296/97.7, 97.8, 97.4; 160/35, 370.2, 84.1

[56] References Cited

U.S. PATENT DOCUMENTS

| | | | |
|---|---|---|---|
| 1,018,498 | 2/1912 | Ilse | 160/84 R |
| 1,804,864 | 5/1931 | Ellis | 160/35 |
| 1,987,259 | 1/1935 | Koehler | 296/97 D |
| 2,305,677 | 12/1942 | Cotton | 296/97 G |
| 2,567,528 | 9/1951 | Rosenthal | 160/35 |
| 2,651,543 | 9/1953 | Chonoski | 296/97 E |
| 3,003,812 | 10/1961 | Haugland | 296/97 E |
| 4,202,396 | 5/1980 | Levy | 296/97 R |
| 4,631,217 | 12/1986 | Anderson | 160/84 R |
| 4,647,102 | 3/1987 | Ebrahimzadeh | 160/370.2 |

FOREIGN PATENT DOCUMENTS 588301  5/1947  United Kingdom ............. 160/84 R

OTHER PUBLICATIONS

J. C. Whitney & Company Auto Parts & Accessories Book-Catalog No. 485J, p, 136.

*Primary Examiner*—Robert R. Song
*Attorney, Agent, or Firm*—Knobbe, Martens, Olson & Bear

[57] ABSTRACT

A substantially rectangular case having an open end is removably secured to a vertical post which forms part of the frame surrounding a vehicle windshield. A substantially opaque shade is formed from a series of hexagonal cells which are collapsible to that the shade can be folded into a compact shape within the case. One edge of the shade is secured to the interior of the case, and the other edge of the shade is attached to a cover plate which encloses the open end of the case when the shade is folded. The shade is opened to an expanded position by drawing the cover plate across the windshield so that the shade extends through the open end of the case. The cover plate is removably attached to a post on the opposite end of the windshield, and maintains the shade in a position to block sunlight from entering the windshield.

28 Claims, 2 Drawing Sheets

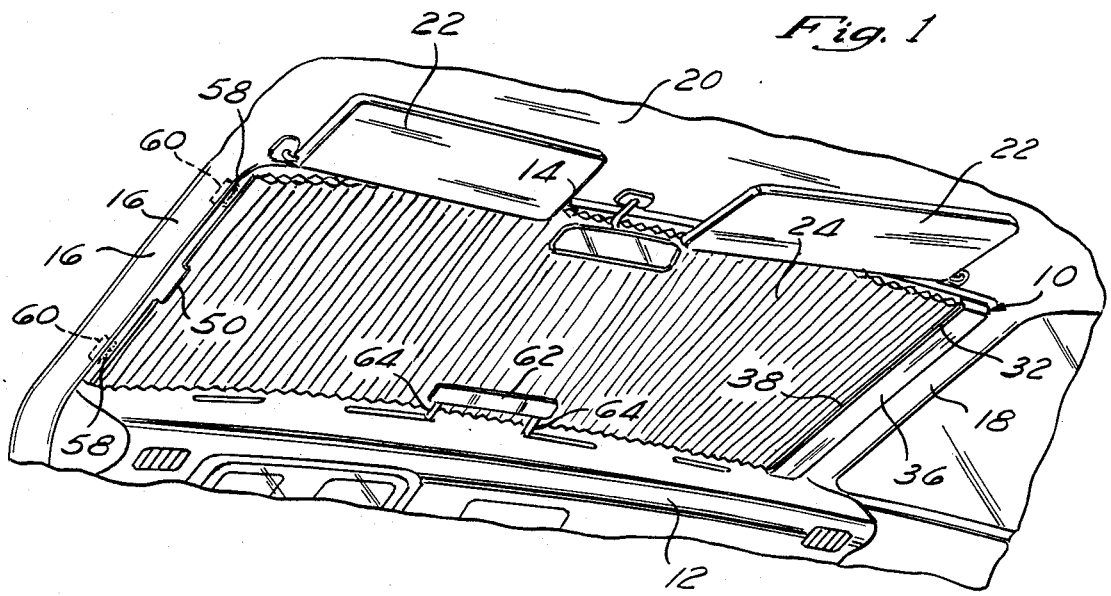
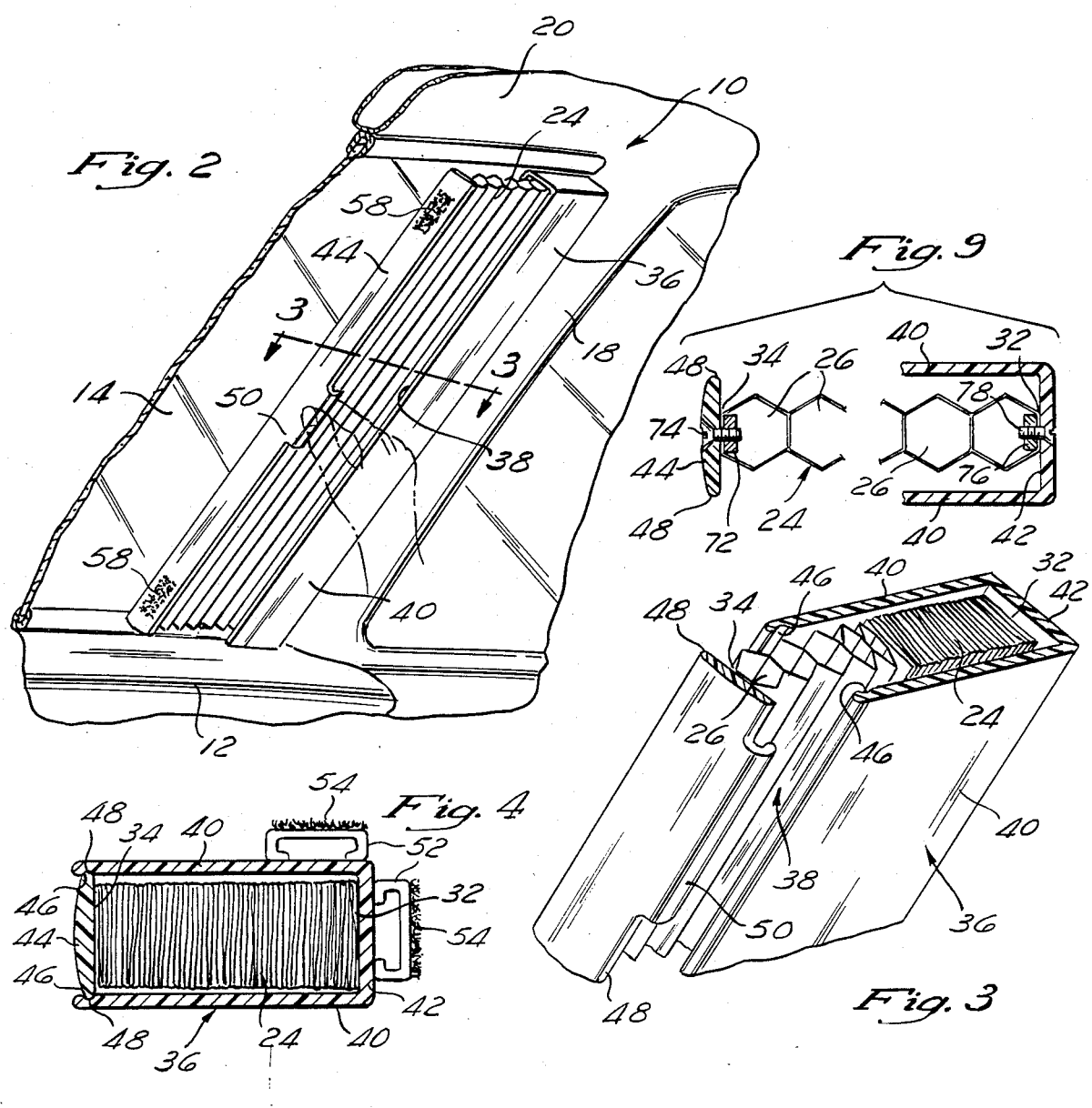

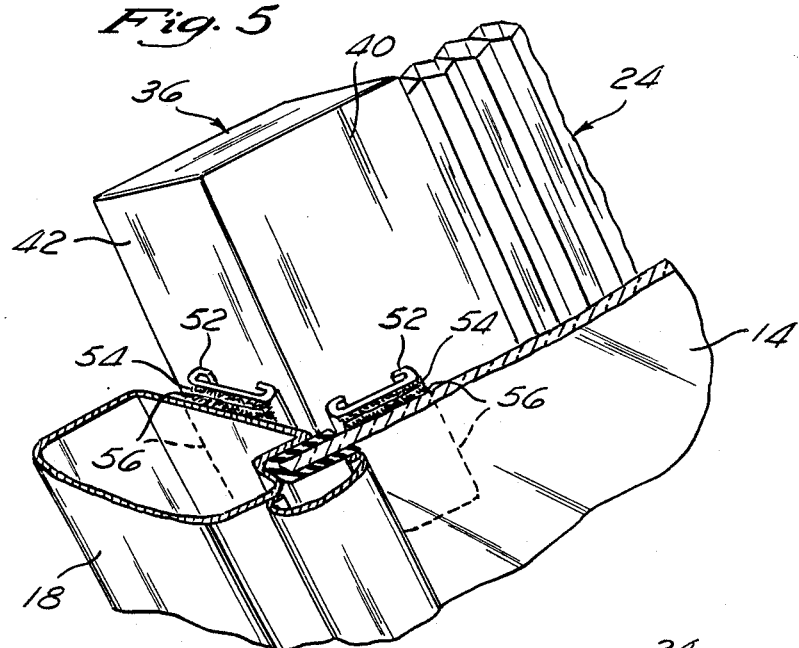
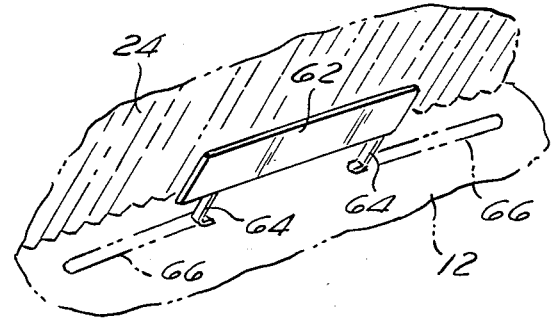
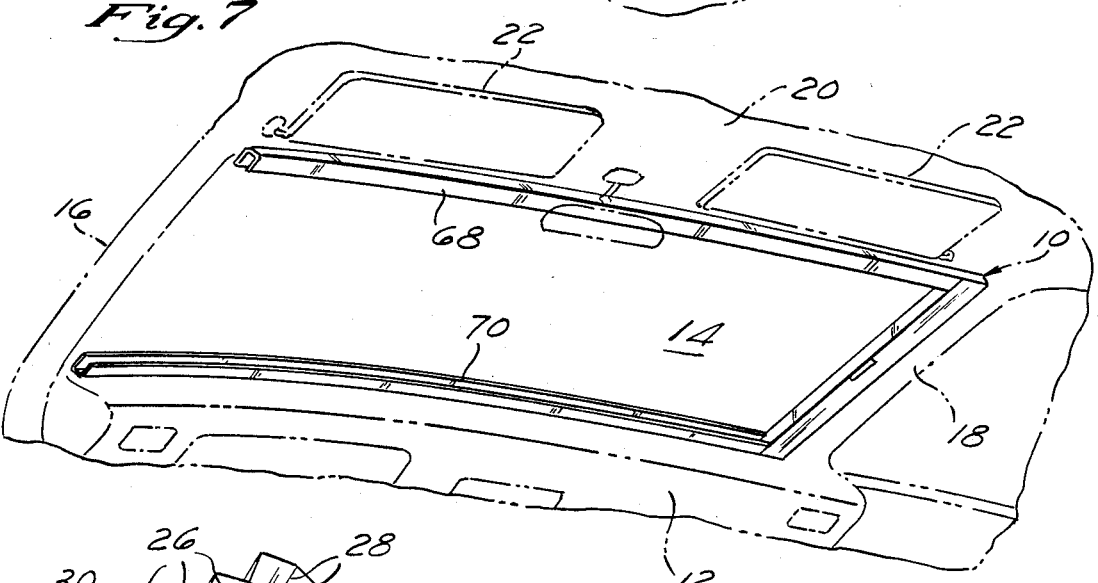
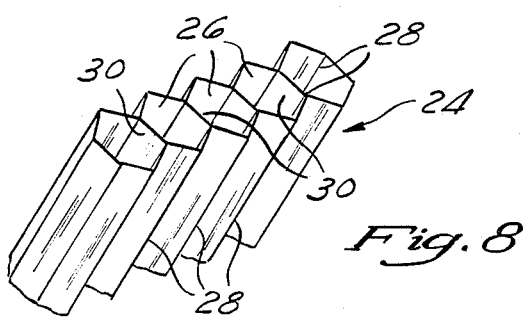

WINDOW SHADE APPARATUS

This application is a continuation of application Ser. No. 014,866, filed on Feb. 17, 1987, which is a continuation-in-part of Ser. No. 881,842 filed July 3, 1986, now abandoned.

BACKGROUND OF THE INVENTION

This invention relates generally to the field of window shades, and more particularly to a shade which is used to protect the interior of a vehicle from the sun's rays.

Sunlight entering the windows of a vehicle, such as a parked car, will cause the air temperature within the car's interior to reach uncomfortably high levels, particularly when all of the windows of the car are shut. In addition, the steering wheel and seats may also be heated to a temperature which makes skin contact painful. Not only does this cause discomfort to the driver and passengers upon returning to the car, these high temperatures and the solar radiation cause fading and cracking of surfaces within the car's interior, such as the dashboard. In order to avoid the discomfort described above, and to avoid the expense of replacing a sun damaged dashboard, it is desirable to provide a means to block the sun's rays from entering the car.

A number of sunscreens have been developed for use in blocking the sun's rays while a car is parked. The patent to Levy (U.S. Pat. No. 4,202,396) discloses a foldable, rigid cardboard sheet which is propped up on the dashboard. Another previous device is a foldable fan which spreads out into a semi-circular shape and is secured to the windshield by means of suction cups. Also, roller shades have been adapted for use on vehicle windows. Typically, the shade is secured to the windshield by suction cups. Also, custom fit blankets have been designed to be secured to the interior of a windshield and entirely cover the windshield.

All of the above devices suffer from a number of drawbacks. Significantly, all of the devices, with the exception of the fan, must be completely removed from the windshield when not in use, so that the driver has unobstructed vision through the windshield. Once removed, the devices are difficult to store within the car since they are large and may not fit within a standard glove compartment. Thus, the device must occupy space on a seat or on the floor of the car. Further, all of the previous devices, except the blanket, have been unable to completely cover the entire windshield due to differences in the shape of the sunscreen and the windshield, thus allowing sun to enter the car. Also, the prior devices are awkward to handle and deploy.

Thus, a need exists for a compact sunscreen which is easy to operate, substantially covers an entire vehicle window, and does not have to be removed from the window when the vehicle is in use.

SUMMARY OF THE INVENTION

The present invention is a window shade apparatus for use in a vehicle, comprising a shade which is foldable into a compact, folded position, and expandable into an expanded position in which the shade substantially covers a window and blocks sunlight from entering the vehicle. A case is secured to the frame surrounding the window and encloses the shade when it is in the folded position. One edge of the shade is secured to the case, and the other edge of the shade is drawn through an open end of the case to draw the shade into the expanded position.

Advantageously, the case is small and unobtrusive and does not obstruct the view through the window when the shade is folded within the case. As a result, the apparatus does not have to be removed from the window and stored when not in use. Further, the case provides an attractive enclosure for the shade which can be matched to the interior styling of the vehicle.

The case may be removably secured to the window frame with a fastening means, such as velcro, so that the entire apparatus may be removed if desired. In one preferred embodiment, the velcro is mounted on deformable members which in turn are attached to the exterior of the case. Upon deformation of the deformable members, the velcro strips can conform to the contour of the window or window frame, and be secured in place despite variations between the external contour of the case and the contour of the window and frame.

A substantially rigid cover plate is attached to one edge of the shade and is removably fastened to the window frame when the shade is in the expanded position. The shade thus expands completely from the side of the window on which the case is attached to the opposite side of the window. A handle is attached to the cover plate so that the apparatus can be easily operated with one hand. The cover plate is also sized to fully enclose the open end of the case. Grooves in the case allow the cover plate to lock into place on the case and provide resistance to the shade's tendency to expand from the folded position.

Preferably, the material used to form the shade is comprised of a series of adjacent, elongated hexagonal cells. The corners of the cells are formed by folds in the material. Advantageously, the air space within the cells enhances the insulative properties of the window shade. The shade material is also flexible so that the shade can conform closely to the curved contour of the windshield, thus avoiding any exposure of the dashboard to sunlight.

BRIEF DESCRIPTION OF THE DRAWINGS

FIG. 1 is a perspective view of a window shade apparatus according to one preferred embodiment of the present invention, installed in an automobile interior, in a fully expanded position.

FIG. 2 is a perspective view of the apparatus of FIG. 1, showing the apparatus in a partially folded position.

FIG. 3 is an enlarged perspective view of the apparatus in the position of FIG. 2, as viewed from line 3—3 in FIG. 2.

FIG. 4 is a horizontal cross sectional view of the present window shade apparatus with the shade in a fully folded position.

FIG. 5 is a partial perspective view of the present apparatus from the exterior of the windshield.

FIG. 6 is a perspective view of a support plate which is secured to the automobile dashboard to hold the shade against the windshield.

FIG. 7 is a perspective view of a vehicle interior incorporating another preferred embodiment of the present invention in which guide channels are provided for the window shade.

FIG. 8 is a perspective view of the material used to form the window shade.

FIG. 9 is a horizontal cross sectional view showing the preferred means for fastening the window shade material to the cover plate and to the case.

DETAILED DESCRIPTION OF THE PREFERRED EMBODIMENTS

FIGS. 1 and 2 show the present window shade apparatus 10 installed within an automobile interior. The automobile interior includes a horizontally oriented dashboard 12 and a windshield 14 extending upwardly from the dashboard 12. A pair of substantially vertical posts 16, 18 extend upwardly from the dashboard 12 on either side of the windshield 14. The surfaces surrounding the periphery of the windshield 14 are generally referred to herein as a "window frame." Thus, the dashboard 12 forms the lower edge of the window frame, and the posts 16, 18 from the side edges of the window frame. The upper edge of the window frame is formed by a roof 20. A pair of sun visors 22 are pivotally secured to the roof 20.

The window shade apparatus 10 includes a shade 24 which is formed from a pleated material that allows the shade 24 to be folded against itself into a compact, folded position, best shown in FIG. 4. The shade 24 is also expandable into a fully expanded position, in which the shade 24 covers substantially the entire windshield 14, as shown in FIG. 1. The shade 24 is substantially opaque and thus blocks sunlight from entering the automobile interior when in the expanded position.

As is best shown in FIG. 8, the shade 24 is generally flexible and is formed from a series of adjacent, elongated, hexagonal cells 26. The corners of the cells 26 are formed by pleats or folds 28 in the shade 24. Each cell 26 shares one of its six walls 30 with an adjacent cell 26. Bending of the shade 24 along the folds 28 allows the cells 26 to collapse into a folded position. Preferably, the shade 24 is fabricated from a material sold by Hunter Douglas under the trade name "Duette."

Referring again to FIGS. 1-4, it can be seen that the shade 24 has two edges 32, 34, both of which extend substantially parallel to the folds 28. One side edge 32 of the shade 24 is secured to a case 36. The case 36 is elongate, rectangular in shape, and has an open end 38 through which the shade 24 passes. The side edges 32, 34 of the shade 24 and the case 36 are both oriented substantially normal to the dashboard 12. The case 36 includes a pair of substantially parallel side walls 40 which are spaced sufficiently to allow the shade 24 to fit therebetween when in a folded position. The space between the side walls 40 also defines the open end 38 of the case 36. Opposite the open end 38, an end wall 42 extends between the side walls 40. The edge 32 of the shade 24 is secured to the interior surface of the end wall 42.

The other side edge 34 of the shade 24 is secured to a substantially planar, rectangular cover plate 44. The cover plate 44 is sized to enclose the open end 38 of the case 36 when the shade 24 is folded. Thus, as shown in FIG. 4, the cover plate 44 and case 36 combine to completely enclose and surround the folded shade 24.

As illustrated in FIGS. 3 and 4, a groove 46 is cut into the interior surface of each side wall 40, adjacent the open end 38. The cover plate 44 has rounded side edges 48 which snap into the grooves 46 so as to lock the cover plate 44 into place on the case 36. Preferably, the side walls 40 of the case 36 are resilient and return to their original position when spread apart, so as to clamp onto the cover plate 44. A handle 50 is provided on the cover plate 44 to facilitate insertion and withdrawal of the cover plate 44 from the grooves 46. When secured to the case 36, the cover plate 44 provides resistance against the tendency of shade 24 to expand from the folded position, as would a compressed spring.

Referring to FIGS. 4 and 5, several deformable members 52 formed from a pliant plastic material are secured to the side wall 40 and to the end wall 42 of the case 36. Mounted onto the deformable members 52 are strips 54 of a hook and pile type fastener, such as that sold under the trade name "Velcro." Mating Velcro strips 56 are fastened to the windshield 14 and to the post 18 as shown in broken lines in FIG. 5. The case 36 can thus be secured to the post 18 by pressing the case 36 into the corner formed by the windshield 14 and the post 18 so as to engage the Velcro strips 54 on the case 36 with the strips 56 on the windshield 14 and post 18. The case 36 extends parallel to the vertical post 18 when secured thereto. Deformation of the deformable members 52 allows the Velcro strips 54 to conform to the curved contour of the post 18 and the windshield 14, more easily than if the strips 54 were directly attached to the flat side walls 40 and end wall 42 of the case 36.

As shown in FIGS. 1 and 2, Velcro strips 58 are also attached to the side of the cover plate 44 which is exposed when the cover plate 44 is secured to the case 36. Mating Velcro strips 60 are secured to the post 16 on the opposite side of the windshield 14 from the case 36. When the shade 24 is fully expanded, the cover plate 44 is secured to the post 16 by pressing the cover plate 44 against the post 16 so as to engage the Velcro strips 58 and 60.

As will be understood from the foregoing, the present window shade apparatus 10 can be easily installed within a vehicle, and is also easy to operate. To install the apparatus 10, the Velcro strips 56, 60 are first secured to the posts 16, 18 and the windshield 14 with a suitable adhesive. Then, with the shade 24 in the fully folded position and the cover plate 44 attached to the case 36, the case 36 is pressed against the post 18 and windshield 14 so as to engage the mating Velcro strips 54, 56. The apparatus 10 can be left in place against the post 18 indefinitely, yet is easily removable for repair, replacement, cleaning, or for storage. Since the case 36 and cover plate 44 completely enclose the shade 24, there is no risk that the shade 24 will be soiled or damaged when the apparatus 10 is removed.

The apparatus 10 may be secured to the post 18 by means other than the Velcro strips 54, 56, such as suction cups, magnets, etc. Alternatively, the case 36 can be incorporated into the post 18 as an original equipment feature on the automobile.

To deploy the shade 24 after installation, the handle 50 is grasped and pulled away from the case 36 so as to dislodge the cover plate 44 from the grooves 46. The shade 24 is unfolded and drawn across the windshield 14 by bringing the cover plate 44 towards the post 16 and thus separating the edges 32, 34 of the shade 24. Once the shade 24 is fully expanded, the cover plate 44 is fastened to the post 16 by engaging the mating Velcro strips 58, 60, thus retaining the shade 24 in the expanded position. To prevent bowing of the shade 24 away from the windshield 14, the upper edge of the shade 24 can be supported by the sun visors 22. As seen in FIG. 1, the shade 24 extends completely across the windshield 14 from post 16 to post 18, and thus effectively prevents sun from entering through the windshield 14. Also, since the shade 24 is flexible, it is able to conform closely to the curvature of the windshield 14, and minimizes the amount of dashboard 12 between the shade 24 and the windshield 14 which is exposed to the sun. In addition to blocking the sun, the air space provided within the cells 26 of the shade 24 act as an insulator.

To return the shade 24 to its folded position, the cover plate 44 is disengaged from the post 16 and brought towards the case 36. As the edges 32 and 34 of the shade 24 are brought together, the shade 24 will naturally return to its folded position, as would a stretched spring. Thus, the shade 24 is easy to manipulate. After the shade 24 is folded into the case 36, the cover plate 44 is pressed into place within the grooves 46. The entire apparatus 10 does not have to be removed from the post 16 and since the case 36 is small and will not obstruct a driver's view through the windshield 14.

As shown in FIGS. 1 and 6, another aspect of the invention is a support plate 62 which is secured to the dashboard 12. The support plate 62 is substantially planar and is oriented substantially parallel to the plane of the windshield 14. A pair of flexible clips 64 extend downwardly from the plate 62 and removably secure the plate 62 to the dashboard 12 by hooking into a pair of defroster slots 66 in the dashboard 12. The support plate 62 presses the shade 24 against the windshield 14 and prevents the shade 24 from bowing away from the windshield 14. Also, the support plate 62 helps to guide the shade 24 as it is drawn out of the case 36 and into the expanded position. Although not shown, the plate 62 may also be secured behind a rear view mirror by means of clips to support the upper edge of the shade.

As shown in FIG. 7, a pair of U-shaped channels 68, 70 may be secured along both the upper and lower edges of the windshield 14, respectively. As the shade 24 is drawn into and out of the case 36, the upper and lower edges of the shade 24 will be contained within the channels 68, 70. Thus, the shade 24 is guided by the channels 68, 70 and is also supported against bowing away from the windshield 14. As will be apparent to those skilled in the art, a mechanical linkage (not shown) may be provided to open and close the shade 24 when utilized in combination with the channels 68, 70. Although not shown, the channels 68, 70 may be segmented into a number of smaller portions.

Referring to FIG. 9, in another preferred embodiment of the present invention, the shade 24 is removably secured to the case 36 and to the cover plate 44. An elongate, planar fastening plate 72 is inserted within the cell 26 adjacent the edge 34 of the shade 24. Threaded holes in the cover plate 44 and the fastening plate 72, and a hole in the shade 24; are aligned so that the fastening plate 72 can be removably secured to the cover plate 44 by means of a screw 74. The edge 34 of the shade 24 is thus sandwiched between the cover plate 44 and the fastening plate 72. Likewise, the other edge 32 of the shade 24 is sandwiched between the end wall 42 of the case 36 and another fastening plate 76. A screw 78 is threaded through holes in the end wall 42 and the fastening plate 76. The shade 24 can be easily detached from the cover plate 44 and case 36 for cleaning, repair, or replacement by unthreading the screws 74, 78.

Modifications and variations of the embodiments described above may be made by those skilled in the art while remaining within the scope of the invention. For example, the apparatus 10 may be used in any window within any type of vehicle, such as a boat, truck, etc. Also, the case 36 may be oriented in a substantially horizontal direction, so that the shade 24 is drawn upwardly and downwardly, as opposed to horizontally. Since the shade 24 is flexible and can be curved about an axis normal to the shade, the case 36 and cover plate 44 may also be curved to more closely conform to the contour of a curved window or window frame.

I claim:

1. A window shade apparatus for use in a vehicle, said apparatus comprising:
    a shade formed from a pleated material having a first edge and a second edge opposite said first edge, said shade being foldable into a compact, folded position by bringing said edges closer together, said shade being expandable into an expanded position by spreading said edges apart, said shade substantially covering an entire window on said vehicle when in said expanded position, and being sufficiently flexible to assume a curvature so as to conform to the shape of the windshield;
    a case which encloses said shade when in said folded position, said first edge of said shade being secured to said case, said case having an open end through which said shade passes when in an expanded position, said case being no wider than said shade, said case having walls which are oriented so as to guide said shade into said case as said shade is folded, so as to minimize bowing of said shade;
    means for securing said case along a substantially vertical first edge of said window;
    means for drawing said shade out of said case in a substantially horizontal direction and into said expanded position;
    means for retaining said shade in said expanded position, wherein said edges of said shade are substantially parallel to each other.

2. The apparatus of claim 1 wherein said drawing means comprises a cover plate which is sized to cover said open end of said case when said shade is in said folded position, said cover plate secured to said second edge of said shade.

3. The apparatus of claim 2 wherein said drawing means further comprises a handle attached to said cover plate.

4. The apparatus of claim 2 wherein said case is formed from an end wall, and two substantially parallel side walls extending from said end wall so as to define said open end, said shade passing between said side walls, said cover plate extending between said side walls to enclose said case.

5. The apparatus of claim 2 wherein said means for retaining said shade in an open position comprises a means for removably fastening said cover plate along a second edge of said window, said second edge of said window being opposite said first edge.

6. The apparatus of claim 5 wherein said fastening means comprises mating strips of velcro on said cover plate and along said second edge of said window.

7. A window shade apparatus for use in an automobile having a dashboard, said window extending upwardly from said dashboard, said dashboard having a plurality of defroster slots therein, comprising:
    a shade formed from a pleated material having a first edge and a second edge opposite said first edge, said shade being foldable into a compact, folded position by bringing said edges closer together, said shade being expandable into an expanded position by spreading said edges apart, said shade substantially covering an entire window on said vehicle when in said expanded position;

a case which encloses said shade when in said folded position, said first edge of said shade being secured to said case, said case having an open end through which said shade passes when in an expanded position;

means for securing said case along a first edge of said window;

means for drawing said shade out of said case and into said expanded position;

means for retaining said shade in said expanded position, wherein said edges of said shade are substantially parallel to each other; comprising an elongated, planar plate which is substantially parallel to said windshield and supports said shade material when in said expanded position, said plate being spaced from said window so that said shade extends between said plate and said window; and means for securing said plate to said dashboard.

8. The apparatus of claim 7 wherein said securing means comprises a resilient clip extending from said plate, said clip extending into said defroster hole to secure said plate to said dashboard.

9. A window shade apparatus for use in a vehicle, said apparatus comprising:

a shade formed from a pleated material having a first edge and a second edge opposite said first edge, said shade being foldable into a compact, folded position by bringing said edges closer together, said shade being expandable into an expanded position by spreading said edges apart, said shade substantially covering an entire window on said vehicle when in said expanded position;

a case which encloses said shade when in said folded position, said first edge of said shade being secured to said case, said case having an open end through which said shade passes when in an expanded position;

means for securing said case along a first edge of said window;

means for drawing said shade out of said case and into said expanded position;

means for retaining said shade in said expanded position, wherein said edges of said shade are substantially parallel to each other;

wherein said case is removably secured to said vehicle and wherein said means for securing said case to said vehicle comprises:

a deformable support member secured to said case;

a strip of velcro attached to a surface along said first edge of said window; and a mating strip of velcro attached to said deformable member, said deformable member confirming said mating velcro strip to the contour of said surface.

10. The apparatus of claim 1 wherein said shade material is formed from a plurality of elongated, substantially hexagonal cells which are joined along folds, said shade expanding and folding in a direction transverse to the orientation of said folds.

11. The apparatus of claim 10 wherein said cells are oriented substantially vertical, said case being secured along a substantially vertically-oriented edge of said window.

12. In an automobile having a dashboard, a windshield extending above said dashboard, and a post extending vertically upwardly from said dashboard on either side of said windshield, a window shade apparatus for covering said windshield and blocking sunlight from entering the interior of said automobile through said windshield, said apparatus comprising:

a shade formed from a substantially opaque, pleated material having a plurality of folds, and having a first edge and a second edge, said folds extending substantially parallel to said edges, said shade being expandable in a substantially horizontal direction to an expanded position by separating said edges, said shade substantially covering the interior of said windshield when in said expanded position, said shade being foldable in a substantially horizontal direction into a compact, folded position by bringing said edges together;

an elongate case removably secured to one of said posts in a substantially vertical orientation, said first edge of said shade secured to the interior of said case, said case being no wider than said shade, said case having an opening through which said shade passes when it is in an expanded position, said case enclosing said shade when in said folded position so that said shade does not obstruct the view through said windshield, said case having a pair of substantially parallel side walls, and an end wall extending therebetween, said side walls defining said open end, said shade being secured to the interior of said end wall, wherein said side walls are substantially parallel to the direction in which said shade is moved to be expanded and folded;

a cover plate attached to said second edge of said shade, said cover plate being removably secured to said case so as to cover said open end of said case when said shade is in said folded position and retain said shade in said folded position, said cover plate being removably secured to the other post when said shade is in said expanded position, so that said shade is retained in said expanded position and extends across the entire width of said windshield; and a handle secured to said cover plate so that said shade can be folded or expanded manually.

13. The apparatus of claim 12 wherein said side walls include grooves therein, the edges of said cover plate mating with said grooves so as to removably secure said cover plate to said case.

14. The apparatus of claim 12 wherein said shade material is formed from a plurality of elongated, substantially hexagonal cells which are joined along folds, said shade expanding and folding in a direction transverse to the orientation of said folds.

15. The apparatus of claim 12 further comprising means for removably securing said shade to said cover plate and to said case so that said shade can be easily replaced.

16. In an automobile having a dashboard, a windshield extending above said dashboard, and a post extending upwardly from said dashboard on either side of said windshield, a window shade apparatus for covering said windshield and blocking sunlight from entering the interior of said automobile through said windshield, said apparatus comprising:

a shade formed from a substantially opaque, pleated material having a plurality of folds, and having a first edge and a second edge, said folds extending substantially parallel to said edges, said shade being expandable to an expanded position by separating said edges, said shade substantially covering the interior of said windshield when in said expanded position, said shade being foldable into a compact, folded position by bringing said edges together;

an elongate case removably secured to one of said posts, said first edge of said shade secured to the interior of said case, said case having an opening through which said shade passes when it is in an expanded position, said case enclosing said shade when in said folded position so that said shade does not obstruct the view through said windshield;

a cover plate attached to said second edge of said shade, said cover plate being removably secured to said case so as to cover said open end of said case when said shade is in said folded position and retain said shade in said folded position, said cover plate being removably secured to the other post when said shade is in said expanded position, so that said shade is retained in said expanded position and extends across the entire width of said windshield;

a handle secured to said cover plate so that said shade can be folded or expanded manually;

a first elongate plate, said first edge of said shade being sandwiched between said first plate and said case;

means for fastening said first plate to said case;

a second elongate plate, said second edge of said shade being sandwiched between said second plate and said cover plate; and means for fastening said second plate to said cover plate.

17. The apparatus of claim 16, wherein said fastening means comprises screws.

18. A window shade apparatus for use in a vehicle, said apparatus comprising:

a substantially rectangular shade formed from a pleated material having a first edge and a second edge opposite said first edge, said shade being foldable into a compact, folded position by bringing said edges closer together, said shade being expandable and into an expanded position by spreading said edges apart along a longitudinal, horizontally oriented axis of said shade, said shade being flexible and curving to conform to and substantially cover a window on said vehicle when in said expanded position;

a case which encloses said shade when in said folded position, said first edge of said shade being secured to said case, said case having an open end through which said shade passes when in an expanded position, and side walls which guide said shade into said folded position;

means for securing said case along a substantially vertical first edge of said window;

a cover plate which is sized to cover said open end of said case when said shade is in said folded position, said cover plate secured to said second edge of said shade;

a handle attached to said cover plate for drawing said shade out of said case and into said expanded position; and means for removably fastening said cover plate along a second edge of said window so as to retain said shade in said expanded position, said second edge of said window being opposite said first edge.

19. The apparatus of claim 18, wherein said fastening means comprises strips of velcro on said cover plate and along said second edge of said window.

20. The apparatus of claim 1, wherein said first and second edges of said shade are oriented substantially vertically.

21. An apparatus for use in a vehicle having a dashboard, and a window extending upwardly from said dashboard, said apparatus comprising:

a shade formed from a pleated material having a first edge and a second edge opposite said first edge, said shade being foldable into a compact, folded position by bringing said edges closer together, said shade being expandable into an expanded position by spreading said edges apart, said shade substantially covering a window on said vehicle when in said expanded position;

a case which encloses said shade when in said folded position, said first edge of said shade being secured to said case, said case having an open end through which said shade passes when in an expanded position;

means for securing said case to a frame surrounding said window;

means for drawing said shade out of said case and into said expanded position;

means for retaining said shade in an expanded position, said retaining means comprising an elongated, planar plate which is substantially parallel to said windshield and supports said shade material when in said expanded position, said plate being spaced from said window so that said shade extends between said plate and said window; and means for securing said plate to said dashboard.

22. The apparatus of claim 21, wherein dashboard has a plurality of defroster slots therein, and wherein said securing means comprises a resilient clip extending from said plate, said clip extending into said defroster slots to secure said plate to said dashboard.

23. A window shade apparatus for use in a vehicle, said apparatus comprising:

a shade formed from a pleated material having a first edge and a second edge opposite said first edge, said shade being foldable into a compact, folded position, by bringing said edges closer together, said shade being expandable into an expanded position by spreading said edges apart, said shade substantially covering a window on said vehicle when in said expanded position;

a case which encloses said shade when in said folded position, said first edge of said shade being secured to said case, said case having an open end through which said shade passes when in an expanded position;

a deformable support member secured to said case;

a strip of velcro attached to said frame;

a mating strip of velcro attached to said deformable member, said deformable member conforming said mating velcro strip to the contour of said frame, so as to removably secure said case to said frame;

means for drawing said shade out of said case and into said expanded position; and means for retaining said shade in said expanded position.

24. The apparatus of claim 6, wherein said velcro is secured to a window frame surrounding said window.

25. The apparatus of claim 9, wherein said surface is formed on a window frame surrounding said window.

26. A window shade apparatus for use in covering a window in a vehicle so as to prevent sunlight from entering said window, said apparatus comprising:

a substantially rectangular shade formed from a substantially opaque material having a plurality of folds forming a plurality of pleats therein, said shade having a first edge and a second edge, said edges being substantially parallel to each other and substantially parallel to said pleats, said shade being foldable along said folds into a compact, folded position by bringing said edges closer together, said shade being expandable into an expanded position by spreading said edges apart in a direction parallel to a longitudinal axis of said shade, said shade substantially covering said entire window when in said expanded position so as to block sunlight from passing through said window and into the interior of said vehicle, said shade curving to conform to said windshield;

a case attached to said first shade edge which at least partially encloses said shade when in said folded position, said case having an opening through which said shade passes when said shade is in said expanded position, said case having walls which guide said shade into a folded position and said case being removably secured to said vehicle along a substantially vertical first edge of said window such that said first edge of said shade is aligned with and substantially parallel to said first window edge; and a fixture for removably securing said second edge of said shade to said vehicle along a second edge of said window such that said second edge of said shade is aligned with and substantially parallel to said window second edge, said edges being substantially parallel when said shade is in said expanded position.

27. The apparatus of claim 26, wherein said fixture comprises a cover plate which is fastened to said second edge of said shade, said cover plate sized to cover said opening in said case when said shade is in said folded position.

28. The apparatus of claim 27, wherein said cover plate and said case are secured to a frame which surrounds said window.

* * * * *